United States Patent
Zagorsky et al.

(10) Patent No.: US 7,666,974 B2
(45) Date of Patent: Feb. 23, 2010

(54) POLYPHENYLENE PRODUCING METHOD

(75) Inventors: Andrei Leonidovich Zagorsky, Kamennoostrovsky pr. d.42, kv. 73, Saint-Petersburg (RU) 197022; Dmitry Kirillovich Toropov, Saint-Petersburg (RU)

(73) Assignee: Andrei Leonidovich Zagorsky, St. Petersburg (RU)

( * ) Notice: Subject to any disclaimer, the term of this patent is extended or adjusted under 35 U.S.C. 154(b) by 0 days.

(21) Appl. No.: 11/817,765

(22) PCT Filed: Feb. 17, 2006

(86) PCT No.: PCT/RU2006/000079

§ 371 (c)(1),
(2), (4) Date: Sep. 4, 2007

(87) PCT Pub. No.: WO2006/096093

PCT Pub. Date: Sep. 14, 2006

(65) Prior Publication Data

US 2008/0194791 A1 Aug. 14, 2008

(30) Foreign Application Priority Data

Mar. 4, 2005 (RU) .............................. 2005106168

(51) Int. Cl.
*C08G 65/38* (2006.01)
*C08G 75/00* (2006.01)

(52) U.S. Cl. .................. 528/219; 524/114; 524/115; 524/186; 524/196; 524/414; 524/496; 528/86; 528/87; 528/217

(58) Field of Classification Search ................ 524/114, 524/115, 186, 196, 414, 496; 528/86, 87, 528/217, 219
See application file for complete search history.

(56) References Cited

U.S. PATENT DOCUMENTS 4,263,426 A * 4/1981 Cooper et al. ............... 528/486
4,404,354 A * 9/1983 Kitamura ..................... 528/86

FOREIGN PATENT DOCUMENTS

RU 598911 B2 3/1978

* cited by examiner

*Primary Examiner*—Terressa M Boykin
(74) *Attorney, Agent, or Firm*—Arent Fox LLP

(57) ABSTRACT

Disclosed is a method for production of polyphenylene by means of polymerization of phenols. The method comprises using hydroquinone as a phenol, which is predissolved in water or in alcoholic solution, adding hydrogen peroxide in the presence of transition metals aquo-ions, and controlling temperature during polymerization keeping it not higher than the boiling point, and controlling pH in the range of 2-7. In on example embodiment, Cr, Mn, Fe, Cu, Ni, Co, Zn aquo-ions or a combination thereof may be used as transition metal aquo-ions.

2 Claims, No Drawings

POLYPHENYLENE PRODUCING METHOD

FIELD OF THE INVENTION

The invention relates to chemistry of polymers, in particular to a method for producing polyphenylene having antihypoxic, antioxidative and antiradical properties.

PRIOR ART

The method for producing polyhydroquinone was chosen as the prototype [the USSR Inventor's Certificate 598911, publ. 02.03.78]. This method is carried out by polymerizing π-benzoquinone in aliphatic alcohols medium at 20-50° C., in the presence of an alkaline catalyst, in particular 0.5-1.0% of potassium alkali, which is added to the reaction mixture as an alcoholic solution (in methanol or ethanol) after dissolving the benzoquinone in an alcohol. The polyhydroquinone produced by said method is used in medicine and it possesses a high antihypoxic activity, antioxidative and antiradical properties. The main drawback of polyhydroquinone obtained according to the prototype method is its high toxicity. Having carried out experiments in accordance with the known method [Good Laboratory Practice for Nonclinically Laboratory Studies (GLP), FDA, 1979], the inventors have determined toxicity index for the product produced by the prototype method—$LD_{50} \approx 650.0$ mg/kg body weight, which does not make it possible to use it in food industry.

SUMMARY OF THE INVENTION

The technical problem to be solved by the present invention is lowering toxicity of the polyphenylene which is produced.

The indicated problem is solved as described below.

Polyphenylene producing method is carried out by polymerization of phenols. This method differs from the prototype method by using hydroquinone as a phenol, which is predissolved in water or in alcoholic solution, adding hydrogen peroxide in the presence of aquo-ions of transition metals, and controlling temperature during polymerization in the range not higher than the boiling point, and controlling pH in the range of 2-7. It is advantageous to use aquo-ions of such metals as Cr, Mn, Fe, Cu, Ni, Co, Zn or a combination thereof. The polymerization process being carried out using 10-20% aqueous hydroquinone solution.

EMBODIMENT OF THE INVENTION

The essence of the present invention is described in more detail in the following examples of its embodiments.

In all the examples the following reagents are used: water distilled according to State Standard 6709-72, hydroquinone according to State Standard 19627-74, hydrogen peroxide $H_2O_2$ according to State Standard 10929-76. The reactions were conducted in neutral or acidic media, and as the sources of aquo-ions aqueous solutions of transition metals (Cr, Mn, Fe, Cu, Ni, Co, Zn) salts hydrates, in particular vitriols, acetates, etc., were used.

EXAMPLE 1

To a reaction vessel equipped with a stirrer, a heat exchanger and a heating element with a temperature controller is added 270 ml of distilled water. At the temperature in the reaction vessel 30° C., 30 g of hydroquinone is added with stirring. 1% Iron vitriol solution $FeSO_4.7H_2O$ (State Standard 4148-78) is prepared, and 1 ml of 1% $FeSO_4.7H_2O$ solution is added to the reaction vessel. The temperature in the reaction vessel is raised to 40° C. Then 100 ml of 30% $H_2O_2$ is added portionwise for 2 hours, maintaining the reaction temperature not higher than 90° C., and the pH level not lower than 2.

The obtained reaction mixture is dried in a drying oven to 1% residual moisture content, and is ground in a ball mill. The formed powder is placed in Soxhlet apparatus and extracted by washing with diethyl ether for 4 hours until full removal of unreacted hydroquinone. The purified product is washed with distilled water, dried in a drying oven to 1% residual moisture content, and is ground in a ball mill to give a powder with particle size of 200 μm.

Yield of the desired product is 29 g. Its toxicity index $LD_{50} \approx 1950$ mg/kg body weight.

EXAMPLE 2

To a reaction vessel equipped with a stirrer, a heat exchanger and a heating element with a temperature controller is added 250 ml of distilled water. At the temperature in the reaction vessel 30° C., 50 g of hydroquinone is added with stirring. 1% $FeSO_4.7H_2O$ solution is prepared, and 1 ml of 1% $FeSO_4.7H_2O$ solution is added to the reaction vessel raising the temperature in the reaction vessel to 40° C. Then 100 ml of 30% $H_2O_2$ is added portionwise for 2 hours, maintaining the reaction temperature not higher than 90° C., and the pH level not lower than 2. The obtained reaction mixture is dried in a drying oven to 1% residual moisture content and is ground in a ball mill. The formed powder is placed in Soxhlet apparatus and washed with diethyl ether for 4 hours until full removal of unreacted hydroquinone. The purified product is washed with distilled water, dried in a drying oven to 1% residual moisture content, and is ground in a ball mill to give a powder with particle size of 200 μm.

Yield of the desired product is 40 g. Its toxicity index $LD_{50} \approx 1560$ mg/kg body weight.

EXAMPLE 3

To the above described reaction vessel is added 270 ml of distilled water. At the temperature in the reaction vessel 30° C., 30 g of hydroquinone is added with stirring. 1% $FeSO_4.7H_2O$ solution is prepared, and 1 ml of 1% $FeSO_4.7H_2O$ solution is added to the reaction vessel raising the temperature in the reaction vessel to 40° C. Then 150 ml of 30% $H_2O_2$ is added portionwise for 2 hours, maintaining the reaction temperature not higher than 90° C., and the pH level not lower than 2. The obtained reaction mixture is dried in a drying oven to 1% residual moisture content, and is ground in a ball mill.

The formed powder is placed in Soxhlet apparatus and washed with diethyl ether for 4 hours until full removal of unreacted hydroquinone. The purified product is washed with distilled water, dried in a drying oven to 1% residual moisture content, and is ground in a ball mill to give a powder with particle size of 200 μm.

Yield of the desired product is 29 g. Its toxicity index $LD_{50} \approx 1320$ mg/kg body weight.

EXAMPLE 4

To a reaction vessel is added 270 ml of distilled water. At the temperature in the reaction vessel 30° C., 30 g of hydroquinone is added with stirring. 1% $FeSO_4.7H_2O$ solution is prepared, and 1 ml of 1% $FeSO_4.7H_2O$ solution is added to the reaction vessel raising the temperature in the reaction vessel to 40° C. Then 100 ml of 30% $H_2O_2$ is added portionwise for 2 hours, the temperature in the reaction vessel being not higher than the boiling point. The reaction mixture is dried in a drying oven to 1% residual moisture content, and is ground in a ball mill. The formed powder is placed in Soxhlet apparatus and washed with diethyl ether for 4 hours until full removal of unreacted hydroquinone.

The purified product is washed with distilled water, dried in a drying oven to 1% residual moisture content, and is ground in a ball mill to give a powder with particle size of 200 μm.

Yield of the desired product is 29 g. Its toxicity index $LD_{50} \approx 1540$ mg/kg body weight.

EXAMPLE 5

To a reaction vessel is added 270 ml of distilled water. At the temperature: in the reaction vessel 30° C., 30 g of hydroquinone is added with stirring. 1% $Cu(CH_3COO)_2.4H_2O$ (copper acetate hydrate) solution is prepared, and 1 ml of 1% $Cu(CH_3COO)_2.4H_2O$ solution is added to the reaction vessel raising the temperature in the reaction vessel to 40° C. Then 100 ml of 30% $H_2O_2$ is added portionwise for 2 hours, maintaining the temperature in the reaction vessel not higher than 100° C., and the pH level not lower than 2.

The reaction mixture is dried in a drying oven to 1% residual moisture content, and is ground in a ball mill. The formed powder is placed in Soxhlet apparatus and washed with diethyl ether for 4 hours until full removal of unreacted hydroquinone.

The purified product is washed with distilled water, dried in a drying oven to 1% residual moisture content, and is ground in a ball mill to give a powder with particle size of 200 μm.

Yield of the desired product is 29 g. Its toxicity index $LD_{50} \approx 1950$ mg/kg body weight.

EXAMPLE 6

To a reaction vessel is added 270 ml of distilled water. At the temperature in the reaction vessel 30° C., 30 g of hydroquinone is added with stirring. 1% zinc vitriol $ZnSO_4.7H_2O$ (zinc sulfate hydrate) solution is prepared, and 1 ml of 1% $ZnSO_4.7H_2O$ solution is added to the reaction vessel raising the temperature in the reaction vessel to 40° C. Then 100 ml of 30% $H_2O_2$ is added portionwise for 3 hours, maintaining the reaction temperature not higher than 100° C., and the pH level not lower than 4.

The reaction mixture is dried in a drying oven to 1% residual moisture content, and is ground in a ball mill.

The formed powder is placed in Soxhlet apparatus and washed with diethyl ether for 4 hours until full removal of unreacted hydroquinone.

The purified product is washed with distilled water, dried in a drying oven to 1% residual moisture content, and is ground in a ball mill to give a powder with particle size of 200 μm.

Yield of the desired product is 29 g. Its toxicity index $LD_{50} \approx 1950$ mg/kg body weight.

EXAMPLE 7

To a reaction vessel is added 270 ml of distilled water. At the temperature in the reaction vessel 30° C., 30 g of hydroquinone is added with stirring. 1% solution of manganese sulfate hydrate ($MnSO_4.H_2O$) is prepared, and 1 ml of 1% $MnSO_4.H_2O$ solution is added to the reaction vessel, raising the reaction temperature to 40° C. Then 100 ml of 30% $H_2O_2$ is added portionwise for 2 hours, maintaining the temperature in the reaction vessel not higher than 90° C., and the pH level not lower than 2.

The obtained reaction mixture is evaporated to 20% concentration of the solution. Yield of the desired product is 150 g. Its toxicity index $LD_5 \approx 9150$ mg/kg body weight.

When the prototype method is used with the same concentration of the desired product (20% solution), the toxicity index is: $LD_{50} \approx 3150$ mg/kg body weight.

EXAMPLE 8

To a reaction vessel equipped with a stirrer, a heat exchanger and a heating element with a temperature controller is added 295 ml of distilled water. At the temperature in the reaction vessel 30° C., 4.5 g of hydroquinone is added with stirring. 1% iron vitriol solution $FeSO_4.7H_2O$ is prepared, and 1 ml of 1% $FeSO_4.7H_2O$ solution is added to the reaction vessel. The temperature in the reaction vessel is raised to 40° C. Then 100 ml of 30% 14202 is added portionwise for 2 hours, maintaining the reaction temperature not higher than 90° C., and the pH level not lower than 2.

The obtained reaction mixture is dried in a drying oven to 1% residual moisture content, and is ground in a ball mill. The formed powder is placed in Soxhlet apparatus and extracted-washed with diethyl ether for 4 hours until full removal of unreacted hydroquinone. The purified product is washed with distilled water, dried in a drying oven to 1% residual moisture content, and is ground in a ball mill to give a powder with particle size of 200 μm.

Yield of the desired product is 4.5 g. Its toxicity index $LD_{50} \approx 1320$ mg/kg body weight.

EXAMPLE 9

To a reaction vessel equipped with a stirrer, a heat exchanger and a heating element with a temperature controller is added 295 ml of distilled water. At the temperature in the reaction vessel 30° C., 4.5 g of hydroquinone is added with stirring. 1% iron vitriol solution $FeSO_4.7H_2O$ is prepared, and 1 ml of 1% $FeSO_4.7H_2O$ solution is added to the reaction vessel. The temperature in the reaction vessel is raised to 40° C. Then 15 ml of 30% $H_2O_2$ is added portionwise for 2 hours, maintaining the reaction temperature not higher than 90° C., and the pH level not lower than 2.

The obtained reaction mixture is dried in a drying oven to 1% residual moisture content, and is ground in a ball mill. The formed powder is placed in Soxhlet apparatus and extracted by washing with diethyl ether for 4 hours until full removal of unreacted hydroquinone. The purified product is washed with distilled water, dried in a drying oven to 1% residual moisture content, and is ground in a ball mill to give a powder with particle size of 200 μm.

Yield of the desired product is 4.3 g. Its toxicity index $LD_{50} \approx 1950$ mg/kg body weight.

EXAMPLE 10

To a reaction vessel equipped with a stirrer, a heat exchanger and a heating element with a temperature controller is added 270 ml of 50% ethyl alcohol solution. At the temperature in the reaction vessel 30° C., 30 g of hydroquinone is added with stirring. 1% iron vitriol solution $FeSO_4.7H_2O$ is prepared, and 1 ml of 1% $FeSO_4.7H_2O$ solution is added to the reaction vessel. The temperature in the reaction vessel is raised to 40° C. Then 100 ml of 30% $H_2O_2$ is added portionwise for 2 hours, maintaining the reaction temperature not higher than 90° C., and the pH level not lower than 2.

The obtained reaction mixture is decanted, dried in a drying oven to 1% residual moisture content, and is ground in a ball mill to give a powder with particle size of 200 μm.

Yield of the desired product is 20 g. Its toxicity index $LD_{50} \approx 1950$ mg/kg body weight.

The inventors obtained similar results using other transition metals aquo-ions mentioned above. The boiling point of the solution varies depending on the reagents used and their concentration. In all the cases the reaction temperature being kept lower than the boiling point.

The obtained polyphenylene is a cyclo-linear oligomer having 2 to 15 phenol rings with molecular weights of 232 to 1665 Da. This is a tasteless and odorless substance having black color, which becomes brown in a diluted aqueous solution. This substance is soluble in water, dimethylformamide and dimethylsulfoxide; it is poorly soluble in acetone; it is not soluble in diethyl ether or ethanol.

The substance has high antihypoxic and moderate antioxidative properties. Its $LD_{50}$ toxicity is 1300-2000 mg/kg body weight, which makes it possible to use it in food industry and in medicine.

The invention claimed is:

1. A method of polyphenylene production comprising:
    dissolving hydroquinone as a phenol in water or in alcoholic solution,
    adding hydrogen peroxide in the presence of transition metals aquo-ions, so that a polymerization process of the phenol is performed, and
    controlling temperature during polymerization keeping it not higher than the boiling point, and controlling pH in the range of 2-7,
    wherein Cr, Mn, Fe, Cu, Ni, Co, Zn aquo-ions or a combination thereof are used as transition metal aquo-ions.

2. The method according to claim 1, characterized in that the polymerization process is carried out using 10-20% hydroquinone solution.

* * * * *